(12) United States Patent
Hayashi

(10) Patent No.: US 7,187,781 B2
(45) Date of Patent: Mar. 6, 2007

(54) INFORMATION PROCESSING DEVICE AND METHOD FOR PROCESSING PICTURE DATA AND DIGITAL WATERMARK INFORMATION

(75) Inventor: Junichi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 10/320,463

(22) Filed: Dec. 17, 2002

(65) Prior Publication Data
US 2003/0128863 A1 Jul. 10, 2003

(30) Foreign Application Priority Data
Jan. 10, 2002 (JP) ............................. 2002-003895

(51) Int. Cl.
*G06K 9/00* (2006.01)
(52) U.S. Cl. ...................... 382/100; 345/638; 348/460; 348/473; 380/200; 380/217; 382/248
(58) Field of Classification Search ................ 382/100, 382/248; 345/638, 641; 348/460, 473; 380/200, 380/201, 217
See application file for complete search history.

(56) References Cited

U.S. PATENT DOCUMENTS 6,037,984 A * 3/2000 Isnardi et al. ............. 375/240.21
6,104,826 A * 8/2000 Nakagawa et al. ......... 382/100
6,389,152 B2 * 5/2002 Nakamura et al. .......... 382/100
6,535,616 B1 * 3/2003 Hayashi et al. ............ 382/100
6,633,653 B1 * 10/2003 Hobson et al. ............. 382/100
6,707,465 B2 * 3/2004 Yamazaki et al. .......... 345/629
6,798,893 B1 * 9/2004 Tanaka ...................... 382/100
7,092,546 B2 * 8/2006 Tanaka ...................... 382/100
7,130,087 B2 * 10/2006 Rhoads ..................... 358/3.28
7,159,117 B2 * 1/2007 Tanaka ...................... 713/176
2001/0055390 A1 12/2001 Hayashi et al.
2002/0172398 A1 11/2002 Hayashi

FOREIGN PATENT DOCUMENTS

EP 1022678 A2 * 7/2000

* cited by examiner

*Primary Examiner*—Gregory Desire
(74) *Attorney, Agent, or Firm*—Fitzpatrick, Cella, Harper & Scinto

(57) ABSTRACT

A device and method for embedding plural kinds of additional information or multiple bits of additional information into one picture is provided. A region information generating step generates region information to specify at least two regions in the real picture spatial or frequency space corresponding to the picture data, a coefficient sequence generating step sets at least two coefficient sequences, which are different from each other, a watermark pattern generating step allocates the coefficient sequences to each divided region to generate watermark patterns, and an embedding step embeds digital watermark information by changing the picture data using the watermark patterns.

8 Claims, 16 Drawing Sheets

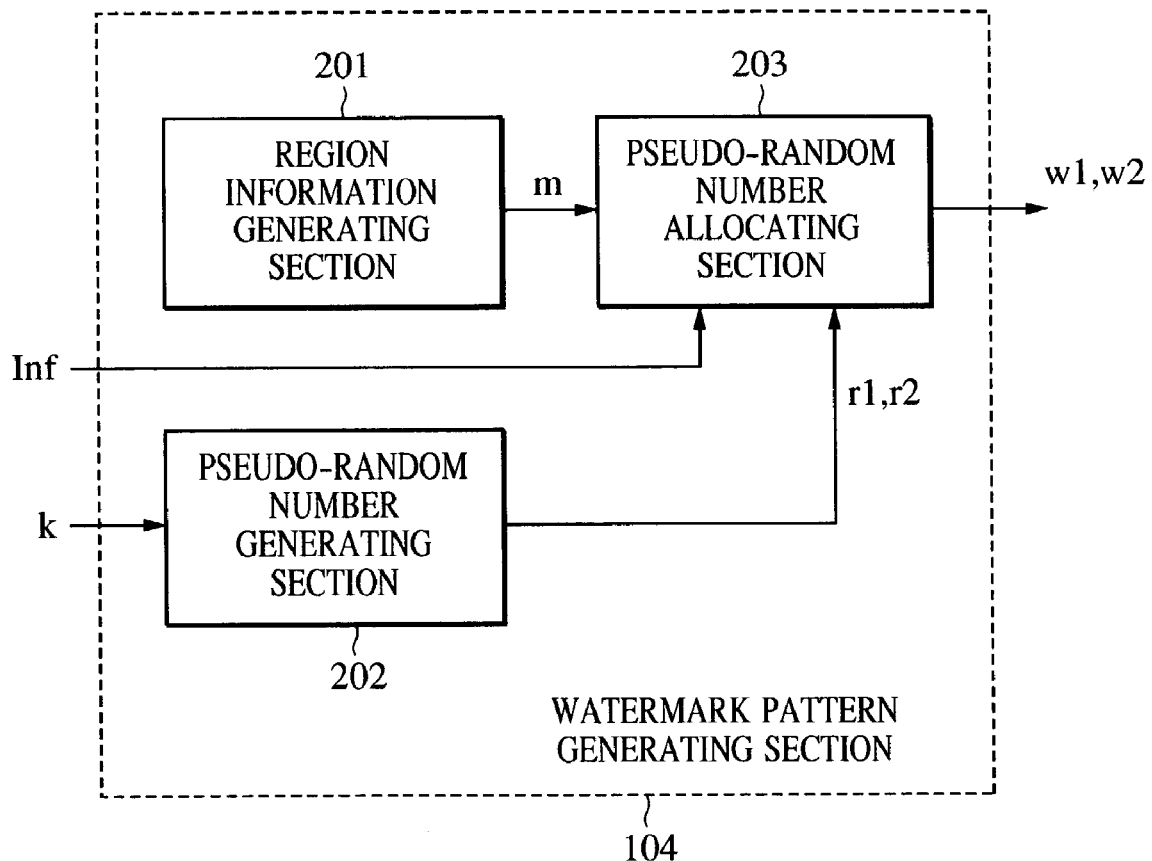

FIG. 4

| FIRST BIT | SECOND BIT | ALLOCATED PSEUDO-RANDOM NUMBER SEQUENCE |
|---|---|---|
| 0 | 0 | +r1 |
| 0 | 1 | −r1 |
| 1 | 0 | +r2 |
| 1 | 1 | −r2 |

FIG. 5 w1

| 0.7 |      |     | -0.6 |
|-----|------|-----|------|
|     | -0.2 | 0.1 |      |
| 0.5 |      |     | -0.3 |
|     | -0.9 | 0.4 |      |

501 w2

|     | -0.2 | 0.6 |      |
|-----|------|-----|------|
| 0.5 |      |     | -0.1 |
|     | -0.3 | 0.9 |      |
| 0.6 |      |     | -0.8 |

$$\begin{array}{|c|c|c|c|}\hline W_{03} & W_{13} & W_{23} & W_{33} \\ \hline W_{02} & W_{12} & W_{22} & W_{32} \\ \hline W_{01} & W_{11} & W_{21} & W_{31} \\ \hline W_{00} & W_{10} & W_{20} & W_{30} \\ \hline\end{array}$$ — 603

$+$ $$\begin{array}{|c|c|c|c|}\hline I_{03} & I_{13} & I_{23} & I_{33} \\ \hline I_{02} & I_{12} & I_{22} & I_{32} \\ \hline I_{01} & I_{11} & I_{21} & I_{31} \\ \hline I_{00} & I_{10} & I_{20} & I_{30} \\ \hline\end{array}$$ — 602

$=$ $$\begin{array}{|c|c|c|c|}\hline I'_{03} & I'_{13} & I'_{23} & I'_{33} \\ \hline I'_{02} & I'_{12} & I'_{22} & I'_{32} \\ \hline I'_{01} & I'_{11} & I'_{21} & I'_{31} \\ \hline I'_{00} & I'_{10} & I'_{20} & I'_{30} \\ \hline\end{array}$$ — 601

701

INFORMATION PROCESSING DEVICE AND METHOD FOR PROCESSING PICTURE DATA AND DIGITAL WATERMARK INFORMATION

BACKGROUND OF THE INVENTION

1. Field of the Invention

The present invention relates to a device for efficiently embedding a digital watermark in a picture and a control method of the device, and to a device for extracting the digital watermark from the picture data and a control method of the device.

2. Description of the Related Art

Recently, because of the rapid development and spread of computers and networks, various types of information such as text data, picture data, voice data, etc. is being digitized. Digital information does not deteriorate over time and can be permanently stored in a perfect state, however it can be easily reproduced by a third party and accordingly copyright protection has become a major issue. In such a context, the importance of security technologies for protecting copyright has rapidly increased.

Digital watermark technology is known as one technology for protecting copyrights. Digital watermarking is a technology to embed information such as the name of the copyright holder or an ID of a purchaser, etc. in digitized picture data, voice data, text data, etc. in such a manner as to prevent a person from recognizing them and to pursue usage of the content without permission by illegal reproduction.

Conventionally, as a methodology to embed a digital watermark, a method using pseudo-random number sequences is known. For example, in a technique for embedding any one of plural kinds of added information, respective pseudo-random number sequences in one-to-one correspondence with each kind of added information are prepared, and the picture data is modulated using the pseudo-random number sequence corresponding with one kind of added information desired to be embedded, thereby embedding the added information.

In this technique, the added information can be extracted from the picture data in which it is embedded by using the pseudo-random number sequence corresponding to that used when embedding and by performing a convolution operation.

However, in the related art described above, normally only one kind of added information is embedded by using any one of the pseudo-random number sequences for one picture, and a technology for increasing the quantity of embeddable added information has not yet been developed.

SUMMARY OF THE INVENTION

A first preferable embodiment of the present invention is an information processing device for embedding digital watermark information in picture data, comprising region information generating means for generating region information specifying at least two regions in a real picture spatial or frequency space corresponding to the picture data, coefficient sequence generating means for setting at least two coefficient sequences, which are different from each other, watermark pattern generating means for allocating a coefficient sequence, on the basis of the digital watermark information to be embedded, to generate a watermark pattern for each divided region, and embedding means for embedding the digital watermark information by changing the picture data using the watermark pattern.

According to another aspect of the present invention, an information processing device for embedding digital watermark information in picture data, includes a region information unit that generates region information specifying at least two regions in a spatial region or a frequency region corresponding to the picture data, a coefficient sequence generating unit that generates at least two different coefficient sequences, a watermark pattern generating unit that allocates coefficient sequences to respective regions specified by the region information, in accordance with the digital watermark information to be embedded, to generate watermark patterns, and an embedding unit that embeds the digital watermark information by changing the picture data using the watermark patterns.

Further objects, features and advantages of the present invention will become apparent from the following description of the preferred embodiments (with reference to the attached drawings).

BRIEF DESCRIPTION OF THE DRAWINGS

FIG. 2 is a block diagram of a detailed structure of a watermark pattern generating section.

FIG. 3 is a view illustrating one example of region information used when additional information Inf consisting of 4-bits is embedded in picture data I.

FIG. 4 is a view illustrating bit allocating rules to be used for a pseudo-random number allocating section.

FIG. 5 is a view for describing one example of a watermark pattern wn that may be generated.

FIG. 6 is a view for describing an example when 4×4 region information m is used as an embodiment of the digital watermark embedding process represented by formula (1).

DESCRIPTION OF THE PREFERRED EMBODIMENTS

First Embodiment

Figure 1:
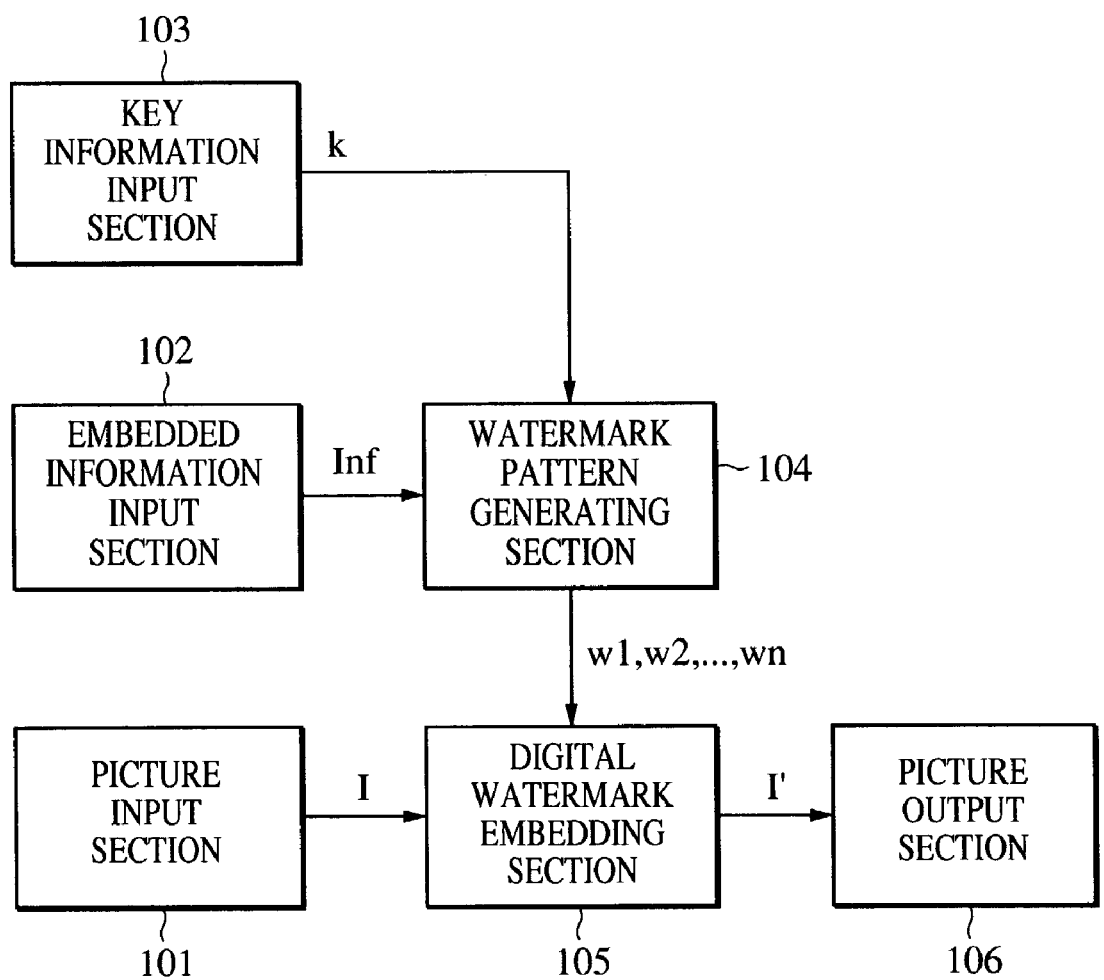
FIG. 1 is a block diagram of a preferred structure of an information processing device for embedding digital watermark information.

First, a preferred embodiment of an information processing device for embedding added information using a digital watermark is described. FIG. 1 shows a block diagram illustrating the structure of the information processing device for embedding digital watermark information according to a first embodiment.

As shown in FIG. 1, the information processing device according to the present invention is formed by a picture input section 101 for inputting picture data I to be embedded with additional information Inf, an embedded information input section 102 for inputting the additional information Inf, a key information input section 103 for inputting key information k to be used when the additional information Inf is embedded, a watermark pattern generating section 104 for generating watermark patterns wn (n=1, 2, . . . ) to be embedded in the picture data from the additional information Inf and the key information k, a digital watermark embedding section 105 for embedding the watermark patterns wn in the picture data I to generate picture data I', and a picture output section 106 for outputting the picture data I' embedded with the additional information Inf.

The picture input section 101 is a terminal for directly inputting the picture data I into the information processing device from a network or external equipment, or a readout device for reading out a picture formed on a medium and converting it into the picture data I. In this embodiment, for the sake of simplicity, the picture data I is considered to display a black and white grayscale picture. However, the embeddable picture data is not limited to black and white picture data. For example, the data may be color picture data consisting of plural color components.

When digital watermark information is embedded in the color picture data, for example, RGB components, as the plural color components, and brightness component and color difference components are used in the same way as the black and white grayscale picture, and watermarking can be achieved by embedding the digital watermark information in each component. In this case, compared to the case where digital watermark information is embedded in the black and white grayscale picture, approximately three times the quantity of data can be embedded. On the other hand, it is also possible to embed the digital watermark information in only some of the components. In this case, the quantity of embeddable data is the same as for the black and white data, but in this case there will be an effect that the components subjected to embedding are almost unidentifiable by other persons.

Additionally, the embedding information input section 102 and the key information input section 103 are terminals for inputting the additional information Inf and the key information k into the information processing device from a network or external equipment, or input devices such as a keyboard for inputting directly.

The additional information Inf input from the embedded information input section 102 is data consisting of a binary data sequence to be embedded in the picture data I by digital watermarking. That is, the additional information Inf is information consisting of several combinations of bits indicating '0' or '1'. The additional information Inf consisting of these bits indicates copyright information to specify an author of the picture data I or user information to specify a user of the picture data I.

The additional information Inf itself may be encrypted so as not to be abused by a third party. Also, it is possible to use error correction coding so as to correctly extract the additional information even when the additional information Inf is changed by a malicious person to prevent extraction of the embedded additional information Inf from the picture data I embedded with the digital watermark.

Changes to the picture data I' embedded with the additional information Inf may include not only intentional changes made by a third party, as described above, but also unintentional changes. For example, by implementing picture processing such as lossy compression of a picture, correction of brightness, geometrical conversion, filtering, etc., the digital watermark information may be affected accordingly. Since the details of encrypting and error correction coding are publicly known, a description of these in this embodiment is omitted.

The key information k input from the key information input section 103 is information required when the additional information Inf is embedded or extracted. For the key information according to this embodiment, real number information expressed as an L-bit integer is used. For example, '01010101' is the key information expressed as a positive number where L=8 and is '85' when expressed as a positive integer.

Additionally, the key information k is output to a pseudo-random number generating section to be described later and is provided as an initial value for the pseudo-random number generating process performed therein. Also, in the information processing device for embedding a digital watermark as described in this embodiment and another information processing device to be described later, the same pseudo-random number can be generated only when common key information k is used, and accordingly the additional information Inf embedded as the digital watermark can be correctly extracted. Thereby only a user who knows the key information k can correctly extract the additional information Inf embedded in the picture data I'.

Next, a detailed structure of the watermark pattern generating section 104 is described. FIG. 2 is a block diagram illustrating a detailed structure of the watermark pattern generating section 104. As shown in FIG. 2, the watermark pattern generating section 104 is formed by a region information generating section 201, a pseudo-random number generating section 202, and a pseudo-random number allocating section 203.

Generated region information m is input to the pseudo-random number allocating section 203 by the region information generating section 201. The region information m is attribute information of each picture element in a small region provided in a matrix used for associating the position of each bit consisting of the added information to the position of a corresponding picture element in the picture data I, where each bit is embedded. FIG. 3 is a view illustrating one example of the region information m to be used when additional information consisting of 4-bits is embedded in the picture data I.

The example shown in FIG. 3 is 4×4 region information m to be used for embedding the additional information Inf consisting of 4-bits. According to the present embodiment, the region indicated in the region information m is associated with the bit position of the additional information Inf. For each element within the region information m, attribute information is allocated to each picture element within the region such as 'A' for a first region and 'B' for a second region. More concretely, bit information of bit position 1 (most significant bit) in the 4-bit additional information Inf and bit information of bit position 2 (next to the most significant bit) are embedded in the first region A indicated in the region information m.

Similarly, bit information of bit position 3 (third bit starting at the most significant bit) and bit information of bit position 4 (fourth bit starting at the most significant bit) of the additional information Inf are embedded in the second region B indicated in the region information m. Thereby 4-bit additional information can be embedded in a picture element with a 4×4 size.

Next, in the pseudo-random number generating section 202, a first pseudo-random number sequence r1 and a second pseudo-random number sequence r2 are generated, with the input key information k being used as an initial value. The generated first and second pseudo-random number sequences r1 and r2 are output to the pseudo-random number allocating section 203, where a real number sequence conforming to a uniform distribution contained within the range [−1, 1] is used for the first and second pseudo-random number sequences r1 and r2. Since methods of generating pseudo-random number sequences are known, a description thereof in this embodiment is omitted.

Furthermore, the region information m generated in the region information generating section 201, the first and second pseudo-random number sequences r1 and r2 generated in the pseudo random number generating section 202, and the additional information Inf from the embedding information input section 102 are input to the pseudo-random number allocating section 203. Each element of the input first and second pseudo-random number sequences r1 and r2 is allocated to a predetermined element of the region information m determined by the bit number of the additional information Inf. The matrix where a random number sequence is allocated to a predetermined element of the region information m is called a watermark pattern wn in this embodiment.

Hereinafter, details of a process to allocate each element of the first and second pseudo-random number sequences r1 and r2 to the predetermined element of the region information m is described.

In this embodiment, the additional information is 4-bit and the 4×4 region information m described in FIG. 3 is adopted. As described above, by using the region information m and two pseudo-random sequences (first and second pseudo-random number sequences r1 and r2), 4-bit additional information can be embedded. Hereinafter, for 4-bit additional information, the first two bits are called a first bit set and the next two bits are called a second bit set.

First, the first bit set is allocated to a first region indicated in the region information m. The first region is, as described above, an element having a value of 'A'. When allocating, among each element within the region information indicated in the region information m, the first region is raster-scanned, and according to the bit allocating rules and the first bit set shown in FIG. 4, an element of either the first pseudo-random number sequence r1 or the second pseudo-random number sequence r2 is sequentially allocated. FIG. 4 is a view illustrating bit allocating rules to be used for a pseudo-random number allocating section 203 according to this embodiment.

That is, when the first bit set of the additional information to be embedded in the first region A is '00', a code of each pseudo-random number within the first pseudo-random number sequence r1 is not changed and the pseudo-random number is allocated one-by-one in raster scanning order to the positions of picture elements having the attribute 'A'. Similarly, when the first bit set of the additional information to be embedded is '01', the code of each pseudo-random number within the first pseudo-random number sequence r1 is reversed (that is, each pseudo-random number is multiplied by −1) and is then similarly allocated one-by-one sequentially. When the first bit set of the additional information is '10', the code of the pseudo-random number within the second pseudo-random number sequence r2 is not changed, and when the first bit set of the additional information is '11', the code of the pseudo-random number within the second pseudo-random number sequence r2 is reversed and then allocated.

Next, the second bit set is allocated to the second region indicated in the region information m. The second region is, as described above, an element having a value 'B'. When allocating, among each element within the region information indicated in the region information m, the second region is raster-scanned, and according to the bit allocating rules and the second bit set shown in FIG. 4, an element of either the second pseudo-random number sequence r2 or the first pseudo-random number sequence r1 is sequentially allocated, similarly to the case for the first bit set.

FIG. 5 is a view for describing one example of a watermark pattern wn generated as described above. In FIG. 5, 4-bit information '0011' is used as the additional information to be embedded, and a real number sequence of pseudo-random numbers r1=[0.7, −0.6, −0.2, 0.1, 0.5, −0.3, −0.9, 0.4] is used, so values '+r1' of the first pseudo-random number sequence r1 corresponding with the first bit set '00' are allocated to the first region A. Values '−r2' of the second pseudo-random number sequence r2 corresponding with the second bit set '11' are allocated to the region B (an example of a real number sequence for r2=[0.2, −0.6, −0.5, 0.1, 0.3, −0.9, −0.6, 0.8] with values inverted for '−r2' is shown as pattern w2 in FIG. 5. In FIG. 5, a reference character 501 indicates a watermark pattern w1 for embedding the first bit set '00'. A reference character 502 indicates a watermark pattern w2 for embedding the second bit set '11'.

In the embodiment described above, though the region information m with a size of 4×4 is used for embedding 4-bit additional information, this invention is not limited only to this. For example, a case in which more picture elements are used for embedding one bit and region information m with a larger size is used is also included in the scope of the present invention. When region information with a larger size is used, a longer real number sequence than the pseudo-random number sequence can be provided. Therefore by using the longer real number sequence, a smaller correlation factor of the integrated picture with the watermark patterns w1, w2, . . . , wn can be prevented regardless of whether or not additional information Inf is embedded. For example, for embedding 64-bit additional information, a filling factor is set to 50% and 256×256 region information is adopted. In this case, 512 picture elements are used for embedding one bit.

Next, the digital watermark embedding section 105 is described. The picture data I and the watermark pattern wn are input to the digital watermark embedding section 105. The watermark pattern wn is embedded in the picture data I and the picture data I' embedded with the watermark pattern wn is output.

A detailed process of the digital watermark embedding section 105 is described. In the digital watermark embedding section 105, digital watermark embedding is performed according to the following formula:

$$I'_{i,j} = I_{i,j} + wn_{i,j} \quad (1)$$

Where $I'_{i,j}$ is picture data embedded with the digital watermarks, $I_{i,j}$ is the picture data before the digital watermark is embedded, $wn_{i,j}$ is the watermark pattern, n is an integer indicating the watermark pattern wn corresponding to the bit position of the additional information to be embedded and the bit position of the added information, and i, j are respectively parameters indicating the x-coordinate and the y-coordinate of the picture data I and I' and the watermark pattern wn.

FIG. 6 is a view for describing an example when 4×4 region information m is used as an embodiment of the digital watermark embedding process represented by formula (1). In FIG. 6, reference character 601 is the picture data I' in formula (1), reference character 602 is the picture data I, and reference character 603 is the watermark pattern wn. Calculation by formula (1) is performed for each element within the matrix as shown in FIG. 6.

Figure 7:
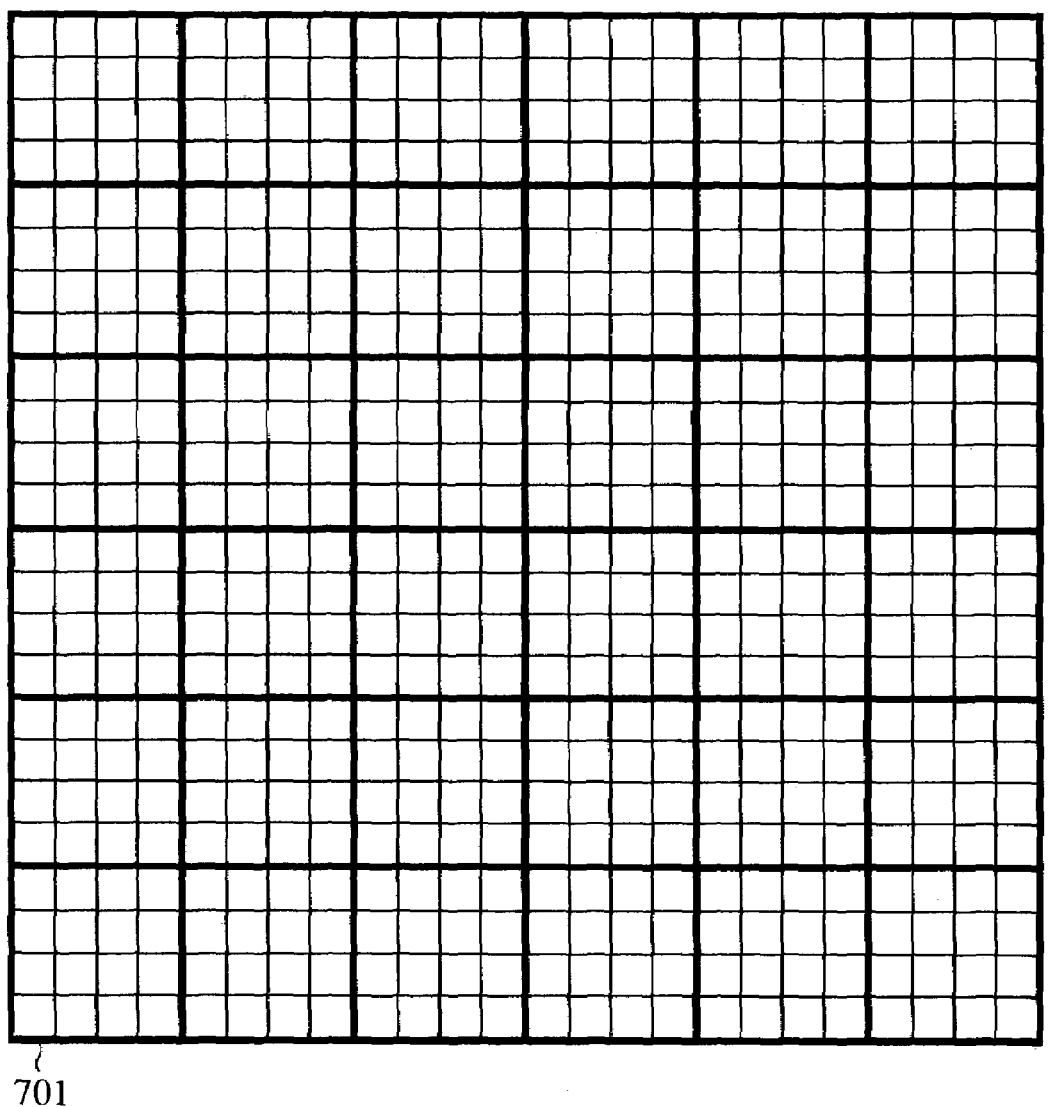
FIG. 7 is a view illustrating picture data I consisting of 24×24 picture elements.

A process to calculate the parameters shown in FIG. 6 by using formula (1) within the region of 4×4 size is in fact repeatedly performed for the whole of the input picture data I. For example, FIG. 7 is a view illustrating the picture data consisting of 24×24 picture elements. As shown in FIG. 7, the input picture data I is divided into blocks that do not overlap with each other consisting of 4×4 picture elements, and for each divided block, as described above, the same calculation shown in formula (1) using the parameters in FIG. 6 is repeatedly performed. Accordingly the block for which the process shown in formula (1) is performed using the parameters in FIG. 6 is called a 'macro block'.

By repeatedly performing a process to embed added information by digital watermarking for all of the macro blocks, the added information can be embedded for the whole picture. In this embodiment, the additional information Inf consisting of n bits can be embedded in one macro block. Accordingly, the n-bit added information can be extracted from at least one macro block. That is, in order to extract the additional information Inf from the picture data embedded with the n-bit additional information Inf, the whole information of the picture data is not needed and solely a part (one macro block embedded with the at least n-bit added information) of the picture data is satisfactory.

As described above, the ability to fully extract digital watermark information from only a part of the picture data I is called 'being resistant to cutting off'. By repeatedly performing the embedding process for the whole picture, using a unit of a macro block for the digital watermark embedding process, the digital watermark can be resistant to cutting off.

Thus, one aspect of the present invention is to provide an information processing device for embedding n-bit digital watermark information into picture data so as to prevent a person from perceiving its existence, comprising a setting means for setting $2^{n-1}$ coefficient arrangements different from each other (e.g., watermark pattern generating section 104), a selecting means for selecting any one of the coefficient arrangements on the basis of n-bit digital watermark information required to be embedded (e.g., watermark pattern generating section 104), an embedding means for embedding the n-bit digital watermark information by dividing the picture data into predetermined picture element blocks, correcting the picture element data at the same relative position in each picture element block using a predetermined coefficient of the selected coefficient arrangement and correcting the other picture element data at the same relative position by sequentially using other coefficients (e.g., digital watermark embedding section 105), wherein Q×n-bit digital watermark information is embedded by dividing groups of picture element blocks into Q groups and embedding n-bit digital watermark information to each group.

In addition, a preferred embodiment of the present invention is characterized by additionally including a key information input means for inputting predetermined key information (e.g., key information input section 103), where the selecting means (e.g., watermark pattern generating section 104) sets a coefficient arrangement according to the input key information.

Furthermore, this embodiment of the present invention is characterized by additionally including a pseudo-random number generating means for generating coefficient arrangements different from each other by using a pseudo-random number sequence (e.g., pseudo-random number generating section 202).

Figure 8:
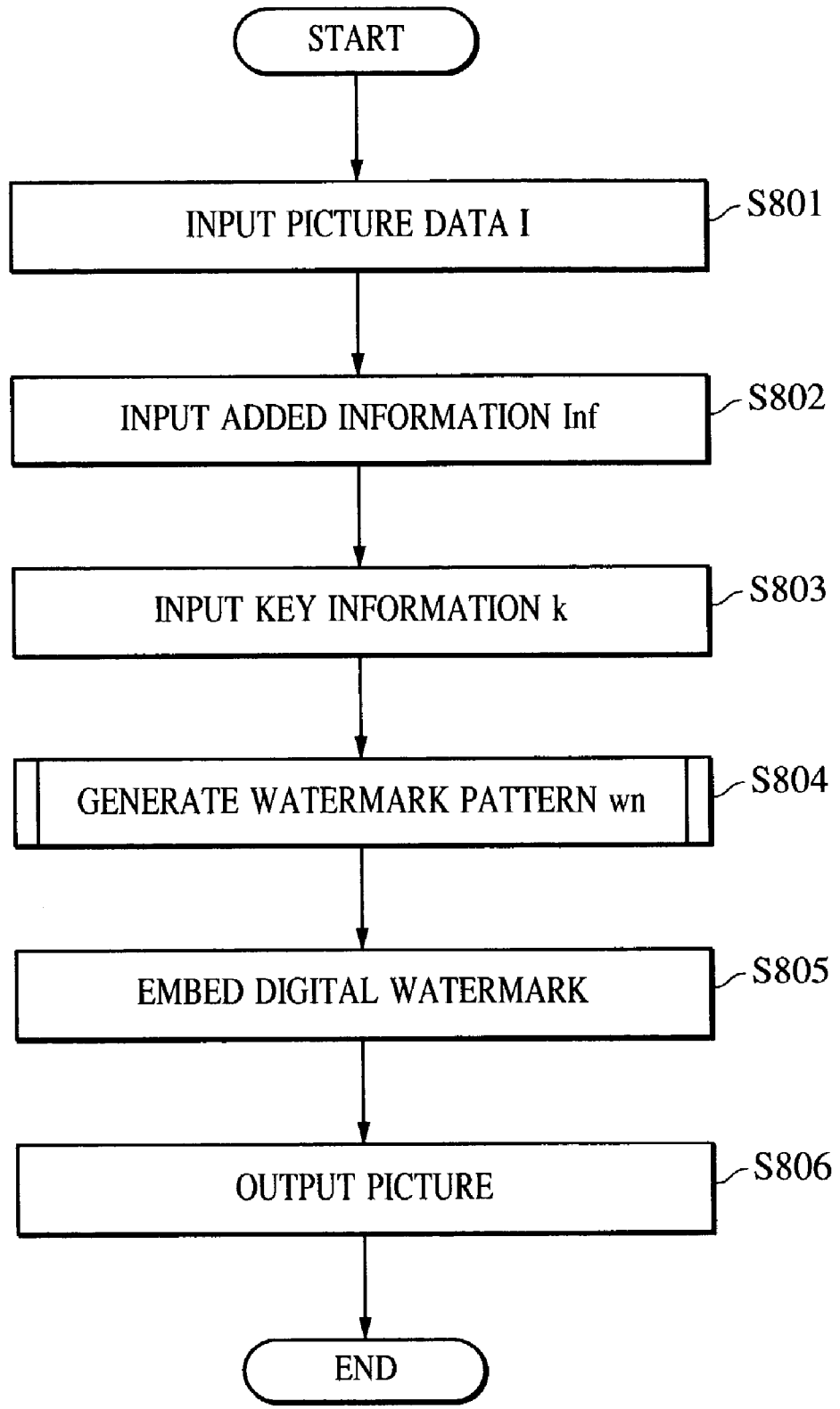
FIG. 8 is a flowchart for describing an operating procedure of the preferred embodiment of the information processing device for embedding added information.

Next is described an operating procedure of the information processing device for embedding the added information in the picture data using the structure described above. FIG. 8 is a flowchart for describing an operating procedure of the information processing device for embedding added information according to this embodiment.

First, the picture data I whereto the additional information Inf is to be embedded is input from a picture input section 101 (Step S801). Next, the additional information Inf to be embedded in the picture data I is input from an embedding information input section 102 (Step S802). Furthermore, the key information k to be used when the additional information Inf is embedded in the picture data I is input from a key information input section 103 (Step S803). Input order of the picture data I, the additional information Inf and the key information k is not limited in this way, and it is also possible to input them all at once.

Figure 9:
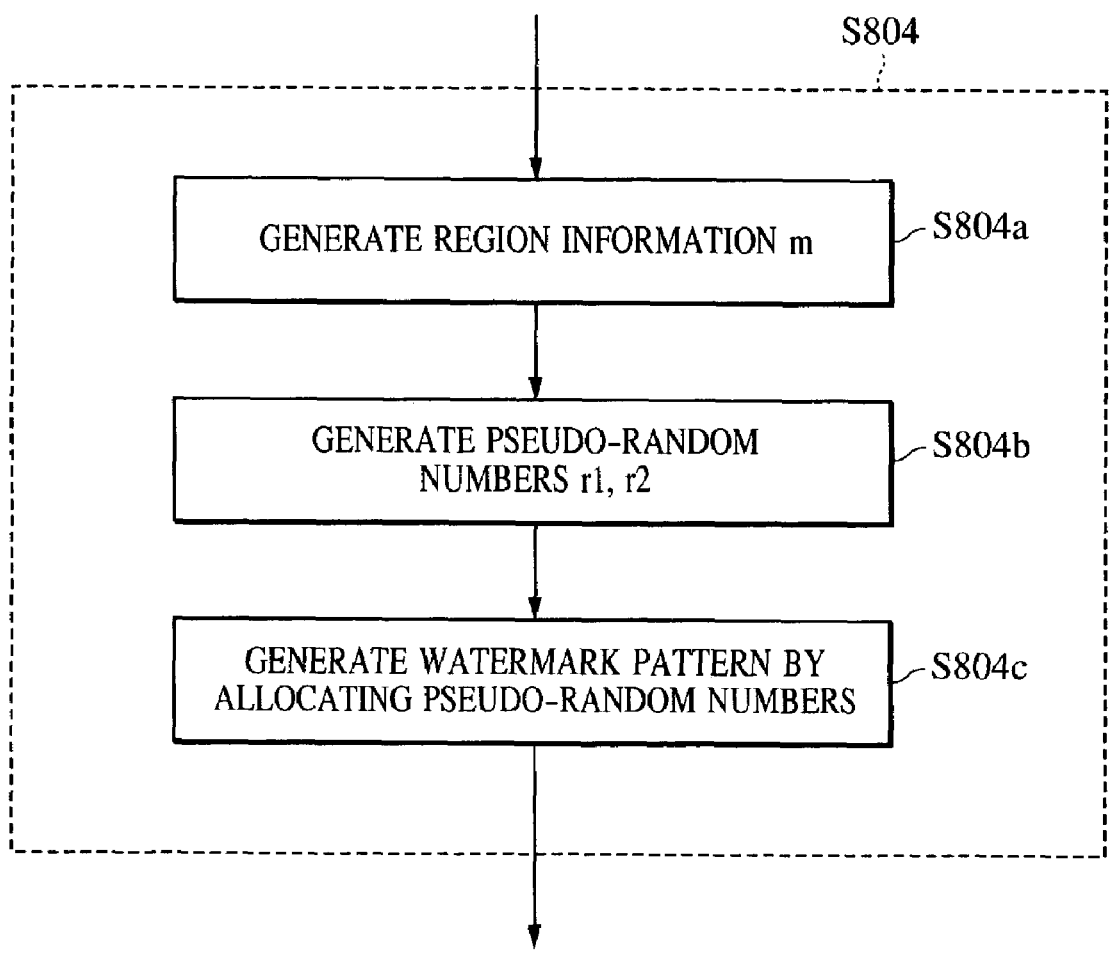
FIG. 9 is a flowchart for describing a preferred embodiment of the generating procedure of the watermark pattern wn performed in the watermark pattern generating section.

Input additional information Inf and key information k are output to a watermark pattern generating section 104, where the watermark pattern wn is generated (Step S804). FIG. 9 is a flowchart for describing a generating procedure of the watermark pattern wn performed in the watermark pattern generating section 104. At the watermark pattern generating section 104, the region information m divided into regions having attribute information, corresponding to the number of bits of the additional information Inf, is generated according to a size of the additional information Inf at a region information generating section 201 (Step S804a). Using the input key information k as an initial value, pseudo-random number sequences (for example, r1 and r2 as described above) are generated at a pseudo-random number generating section 202 (Step S804b). Additionally, the region information m, the pseudo random numbers r1 and r2 and the additional information Inf are input to a pseudo-random number allocating section 203, where the watermark patterns (for example, w1, w2 as described above) are generated (Step S804c).

Thus generated watermark patterns are input to the digital watermark embedding section 105, where the picture data I' already embedded with the digital watermark is generated (Step S805). The picture data I' is output as a final output of the digital watermark embedding section from a picture output section 106 (Step S806 of FIG. 8).

In this embodiment, a method wherein one picture is divided into 4×4 picture element blocks and 4-bits are embedded is described. It is also possible to embed 4 or more bit digital watermark information in each block. Furthermore it is possible to divide one picture into plural regions and apply the method for embedding digital watermark information as described above to each region. In this case, for example, the picture data is divided into p regions and q bit digital watermark information is embedded in each region and thereby p×q bit digital watermark information can be embedded in the picture data.

Second Embodiment

Figure 10:
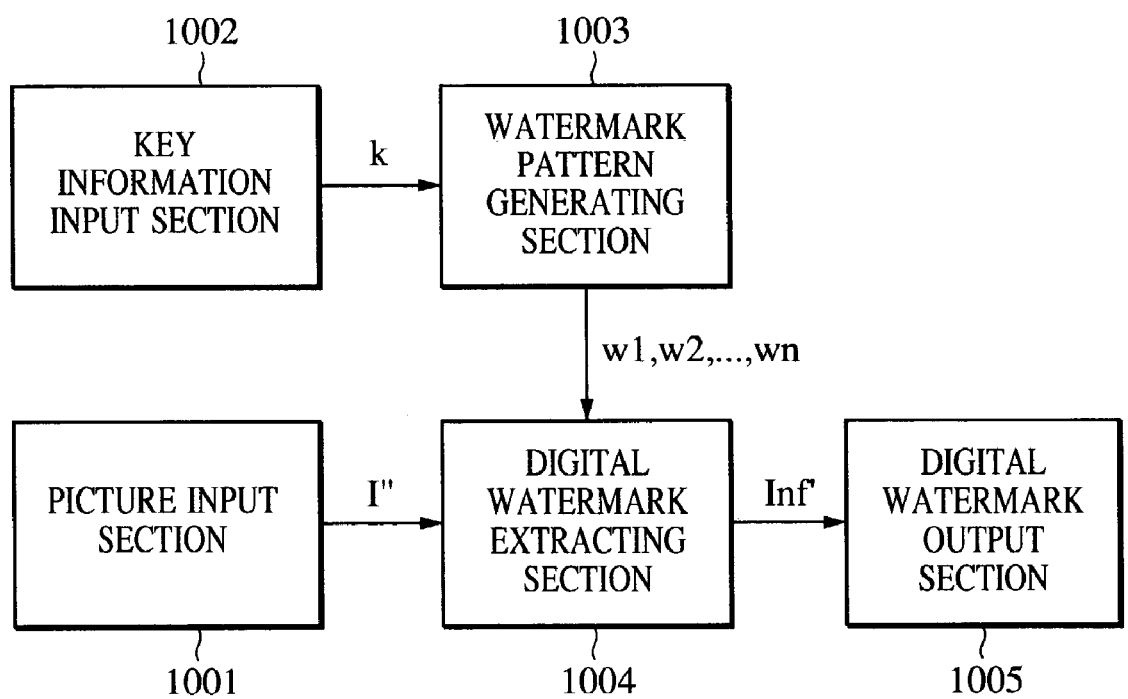
FIG. 10 is a block diagram illustrating the structure of a preferred embodiment of an information processing device for extracting digital watermark information.

Next, a preferred embodiment of the information processing device for extracting digital watermark information embedded in the picture according to the method described in the first embodiment is described. FIG. 10 is a block diagram illustrating the structure of an information processing device for extracting digital watermark information according to this embodiment.

As shown in FIG. 10, the information processing device for extracting digital watermark information is formed by a picture input section 1001 for inputting picture data I" embedded with a digital watermark, a key information input section 1002 for inputting key information to be used for extracting additional information Inf', a watermark pattern generating section 1003 to generate watermark patterns, a digital watermark extracting section 1004 to extract the additional information Inf', and a digital watermark output section 1005 to output the extracted added information.

First, a picture input section 1001 is described. Picture data I" possibly embedded with digital watermark information is input in the picture input section 1001. Since operation of the picture input section 1001 is the same as that of the picture input section 101, a detailed description of operation is omitted here.

The picture data I" input from the picture input section 1001 is not limited in the picture data I' embedded with added information by the digital watermark embedding section 105. That is, it may be that the picture data I" embedded with added information is changed in contents from the picture data I'. Additionally, it may be that the picture data I" is embedded with no added information.

Next, the key information input section 1002 is described. Key information k for extracting embedded added information is input from the key information input section 1002, where the key information k to be input should be the same as the one input from the key information input section 103 according to the first embodiment. That is, when information different from the key information k input from the key information input section 103 is input, the added information embedded in the picture data cannot be correctly extracted since the same pseudo-random number sequence as the one used when the added information was embedded cannot be generated. Therefore, the correct added information is extracted only to the user who knows the correct key information k.

Next, the watermark pattern generating section 1003 is described. The key information k is input to the watermark pattern generating section 1003 from the key information generating section 1002, watermark pattern wn is generated on the basis of the input key information k, and the generated watermark pattern wn is output. The watermark pattern generating section 1003 comprises each section shown in FIG. 2 similarly to the watermark pattern generating section 104. Since a process to be executed at the pseudo-random number allocating section is different from the first embodiment, the process at the pseudo-random number allocating section is described here.

Region information generated at the region information generating section, a first pseudo-random number sequence r1 generated at the pseudo-random number generating section, and a second pseudo-random number sequence r2 are input to the pseudo-random number allocating section of the watermark pattern generating section 1003, and the first and second pseudo random number sequences are allocated according to the region information m to be output as the watermark pattern wn.

That is, in the watermark pattern generating section 1003, firstly, the first region of elements having a value of 'A' within the region information shown in the region information m is raster-scanned, and each pseudo-random number within the first pseudo-random number sequence r1 is sequentially allocated. Next, the first region of the elements having the value of 'A' is raster-scanned, and each pseudo-random number within the second pseudo-random number sequence r2 is sequentially allocated. Furthermore, of each element within the information region shown in the region information m, a second region of the elements having a value of 'B' is raster-scanned, and pseudo-random numbers within the first pseudo-random number sequence r1 are sequentially allocated. Then the second region of the elements having the value of 'B' is raster-scanned, and each pseudo-random number within the second pseudo-random number sequence r2 is sequentially allocated.

Figure 11:
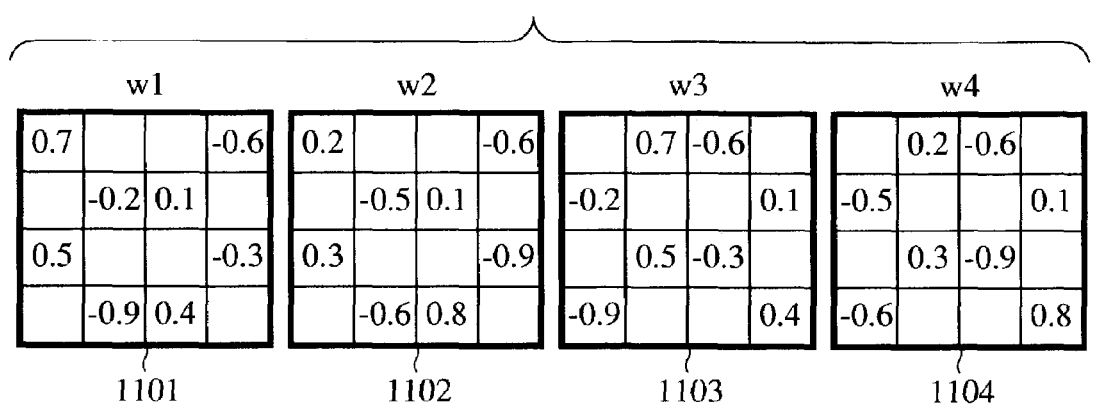
FIG. 11 is a view illustrating one example of a watermark pattern generated in a watermark pattern generating section according to a second embodiment.

FIG. 11 is a view illustrating one example of a watermark pattern generated in a watermark pattern generating section 1003 according to the second embodiment. In FIG. 11, a real number sequence of r=[0.7, −0.6, −0.2, 0.1, 0.5, −0.3, −0.9, 0.4] as the first pseudo-random number sequence is used, and a real number sequence of r=[0.2, −0.6, −0.5, 0.1, 0.3, −0.9, −0.6, 0.8] as the second pseudo-random number sequence is used. These pseudo-random numbers are similar to the ones used when the added information is embedded according to the above-described embodiment. By allocating r1 and r2 to A, B regions generated when an example of region information with a size of 4×4, as shown in FIG. 3, using these pseudo-random numbers as the region information m, the watermark patterns w1–w4 are generated.

Next, the digital watermark extracting section 1004 is described. The picture data I" and the watermark patterns w1, w2, w3, w4 are input to the digital watermark extracting section 1004. By using the watermark patterns w1, w2, w3, w4, the additional information Inf' is extracted from the picture data I". The extracted additional information Inf' is usually the same as the embedded additional information Inf, however, when the picture data I' embedded with digital watermark is variously changed in contents, the additional information Inf does not necessarily correspond with the additional information Inf'.

According to this embodiment, in the digital watermark extracting section 1004, cross-correlations between an integrated picture generated from the input picture data I" and the watermark patterns w1, w2, w3, w4 are respectively calculated. The integrated picture is one in which the input picture data I" is divided into blocks that do not overlap with each other having a size of a macro block (a size of the region information), and an average of values of respective divided block elements is calculated.

Figure 12:
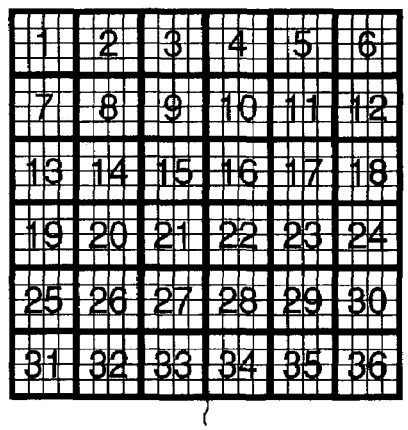
FIG. 12 is a view for describing an embodiment for an integrated picture.

FIG. 12 is a view for describing an embodiment for the integrated picture. FIG. 12 shows an example of a watermark pattern of 4×4 picture elements with an integrated picture when a picture 1201 of 24×24 picture elements is used. In FIG. 12, reference character 1201 is an example when the picture data 1201 of 24×24 picture elements are divided into blocks of 4×4 picture elements that do not overlap with each other. In FIG. 12, the picture data 1201 is divided into 36 blocks. The integrated picture 1202 is the one provided with an average of each element of these 36 blocks. In the digital watermark extracting section 1004, cross-correlations between the thus generated integrated picture 1202 and the watermark patterns w1, w2, w3, w4 are respectively calculated.

Next, a concrete method for calculating the cross-correlations is described using an example when a correlation coefficient ρ between the integrated picture 1202 and the watermark pattern wn is calculated. The correlation coefficient ρ is a statistical quantity to measure similarity between c and wn, where an integrated picture is c and a watermark pattern is wn, and is expressed as in the following formula:

$$\rho = \frac{c'^T \cdot wn'}{|c'^T||wn'|}$$

where, c' and wn' are matrices respectively having as elements the values obtained by subtracting the average of each matrix element from each corresponding element of the integrated picture and the watermark pattern wn.

In this embodiment, since cases in which picture element values vary extremely within a range of a size of 4×4 picture elements in a natural picture are few, the values minus the integrated picture average are used as elements. $c^T$ is a transposed matrix of c. Thereby the correlation coefficient ρ is a value between −1 and +1.

For example, the correlation coefficient ρ between the integrated picture and the watermark pattern wn approaches +1 when a positive correlation is stronger, while the correlation coefficient ρ approaches −1 when a negative correlation is stronger. Where 'positive correlation is stronger' means a relationship such that 'as the integrated picture is larger, the watermark pattern wn is larger'. And where 'negative correlation is stronger' means a relationship such that 'as the integrated picture is larger, the watermark pattern wn is smaller'. When the integrated picture and the watermark pattern wn are unrelated, the correlation coefficient is 0.

In the digital watermark extracting section 1004, the embedded additional information Inf' is extracted according to the cross-correlation result in said procedure. When there are plural watermark patterns, correlation coefficients between the integrated picture and respective watermark patterns w1, w2, w3, w4 are calculated, and from the calculated correlation results, by using the bit allocating rules shown in FIG. 4, the embedded additional information Inf' is determined.

Thus, finding cross-correlations is equivalent to evaluating to what level the integrated picture and the watermark patterns w1, w2, . . . , wn are similar. That is, at the digital watermark embedding section 105 shown in FIG. 1, when the watermark patterns w1, w2, . . . , wn are embedded in the picture data I' as an integrated picture, these are relatively similar, and the similarity is calculated as a cross-correlation value. When the watermark pattern wn is added and embedded, the cross-correlation value is positive, and when the watermark pattern wn is subtracted, the value is negative.

Accordingly, when the first pseudo-random number sequence r1 is added to the first region A shown in the region information m, the correlation coefficient of the watermark pattern w1 and the integrated picture gives a value near '1'. While, when the first pseudo-random number sequence r1 is subtracted from the first region A shown in the region information m, the correlation coefficient of the watermark pattern w1 and the integrated picture gives a value near '−1'. Additionally, when the first pseudo-random number sequence r1 is added to or subtracted from the first region shown in the region information m, the correlation coefficient of the watermark pattern w2 and the integrated picture gives a value near '0'.

Thus the correlation coefficients of the entire watermark patterns w1, w2, w3, w4 and the integrated picture are calculated. From the thus provided correlation coefficient, the embedded bit set is determined on the basis of the bit allocating rules shown in FIG. 4 and the additional information Inf can be extracted.

Figure 13:
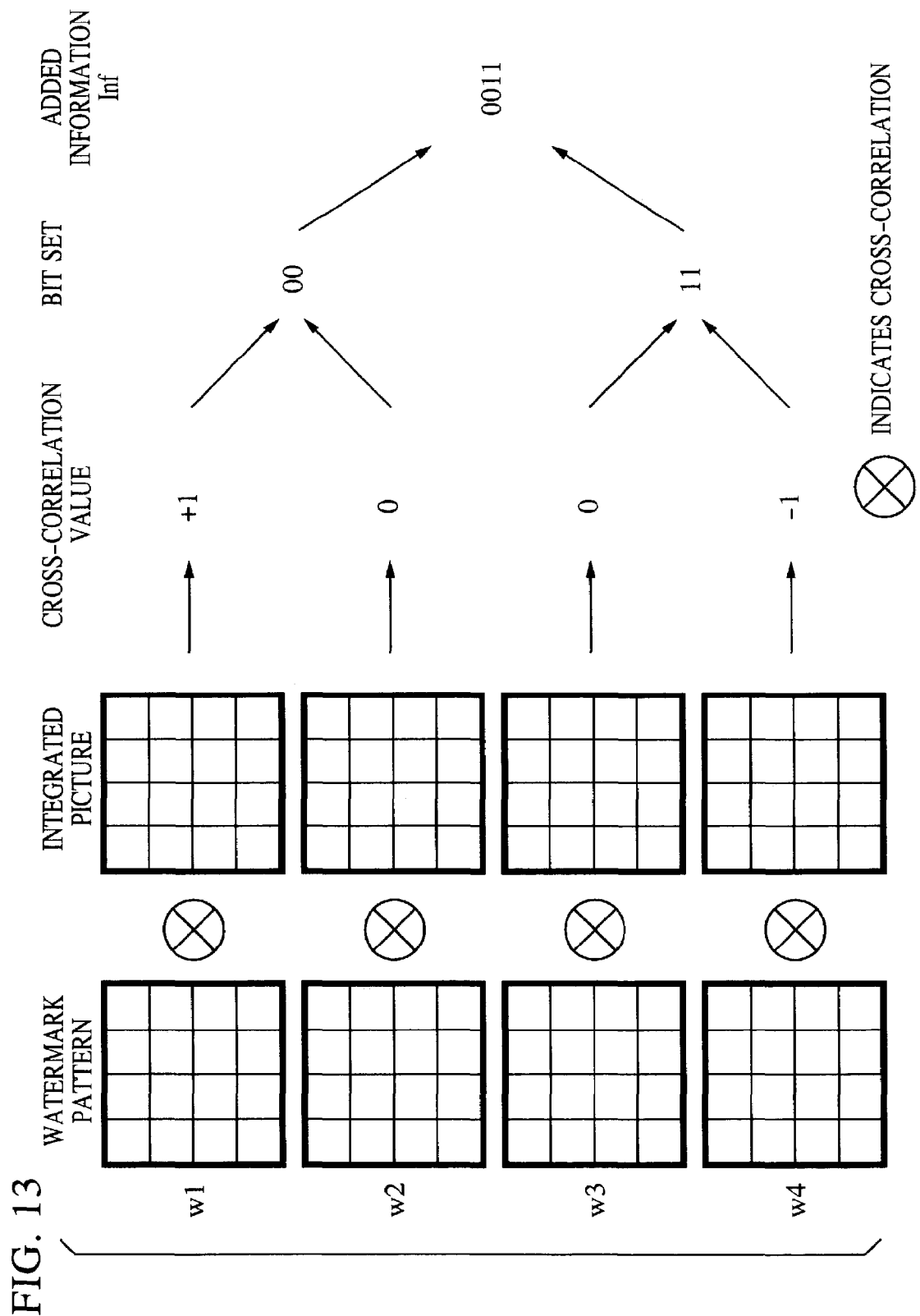
FIG. 13 is a view for describing a process to extract added information '0011' from the integrated picture embedded with 4-bit added information '0011' by using watermark parameters w1–w4.

FIG. 13 is a view for describing a process to extract added information '0011' from the integrated picture embedded with 4-bit added information '0011' by using watermark parameters w1, w2, w3, w4.

First the correlation coefficients between the integrated picture and four watermark patterns w1, w2, w3, w4 corresponding to the 4-bit additional information Inf' are respectively calculated. When the additional information Inf' is embedded in the picture data I' as an input integrated picture, the correlation coefficients are calculated to be '+1, 0, 0, −1' respectively. Here it can be seen that from the correlation coefficient '+1, 0' between the watermark patterns w1, w2 and the integrated picture, the first pseudo-random number sequence r1 is added to the first region shown in the region information m. Accordingly, by the bit allocating rules shown in FIG. 4, the first bit set is determined to be '00'.

Additionally it can be seen that from the correlation coefficient '0, −1' between the watermark patterns w3, w4 and the integrated picture, the second pseudo-random number sequence r2 is subtracted from the second region shown in the region information m. Accordingly, by the bit allocating rules shown in FIG. 4, the second bit set is determined to be '11'. Thereby the embedded additional information Inf' '0011' can be extracted.

The thus extracted additional information Inf' is output from a digital watermark output section 1005. At that time, if an error-correction-coding process or encryption process is performed when the additional information Inf is embedded at the digital watermark embedding section 105, an error-correction-decoding process or cipher-decoding process is respectively performed. In that case, afterward, the acquired information is output as additional information Inf' consisting of binary data sequences from which the acquired information is finally extracted.

In this embodiment, the first and second regions A,B are used as region information m for embedding 4-bit information, and the first and second pseudo-random number sequences r1 and r2 are used as pseudo-random number sequences. However, this invention is not limited to this. By using s regions as region information m and t pseudo-random number sequences as pseudo-random number sequences, s×t-bit information can be embedded.

Thus, an aspect of the present invention is to provide an information processing device for extracting different from each other (e.g., watermark pattern generating section 1003), a selecting means for selecting any one of the coefficient arrangements on the basis of n-bit digital watermark information required to be embedded (e.g., watermark pattern generating section 1003), a correlation calculating means for dividing the picture data into predetermined picture element blocks and correcting the picture data at the same relative position in each picture element block using a predetermined coefficient of the selected coefficient sequence for calculating correlation between corrected values acquired by sequentially using other coefficients and an average of the picture data of the picture block even for other picture elements at the same relative position (e.g., watermark pattern generating section 1003), and an extracting means for selecting one coefficient sequence corrected in the picture element block on the basis of summation of correlation for predetermined picture element blocks calculated for $2^n$ coefficient sequences and extracting embedded bits from the selected coefficient sequence (e.g., digital watermark extracting section 1004).

Additionally, the present embodiment of the invention is characterized by that the correlation calculating means (e.g., watermark pattern generating section 1003) comprises in addition an average value generating means for generating an average picture element block for predetermined picture element blocks into which the picture data are divided and the extracting means (e.g., digital watermark extracting section 1004) selects one coefficient sequence corrected in the picture element block on the basis of the calculated correlation between the generated average picture element block and $2^n$ coefficient sequences and extracts embedded bits from the selected coefficient sequence.

Furthermore, the present invention is characterized by that the device comprises in addition the key information input means (key information input section 1002) to input the key information that was used when the electronic information was embedded and that the selecting means (e.g., watermark pattern generating section 1003) sets $2^n$ coefficient sequences, which are different from each other, on the basis of the input key information.

Figure 14:
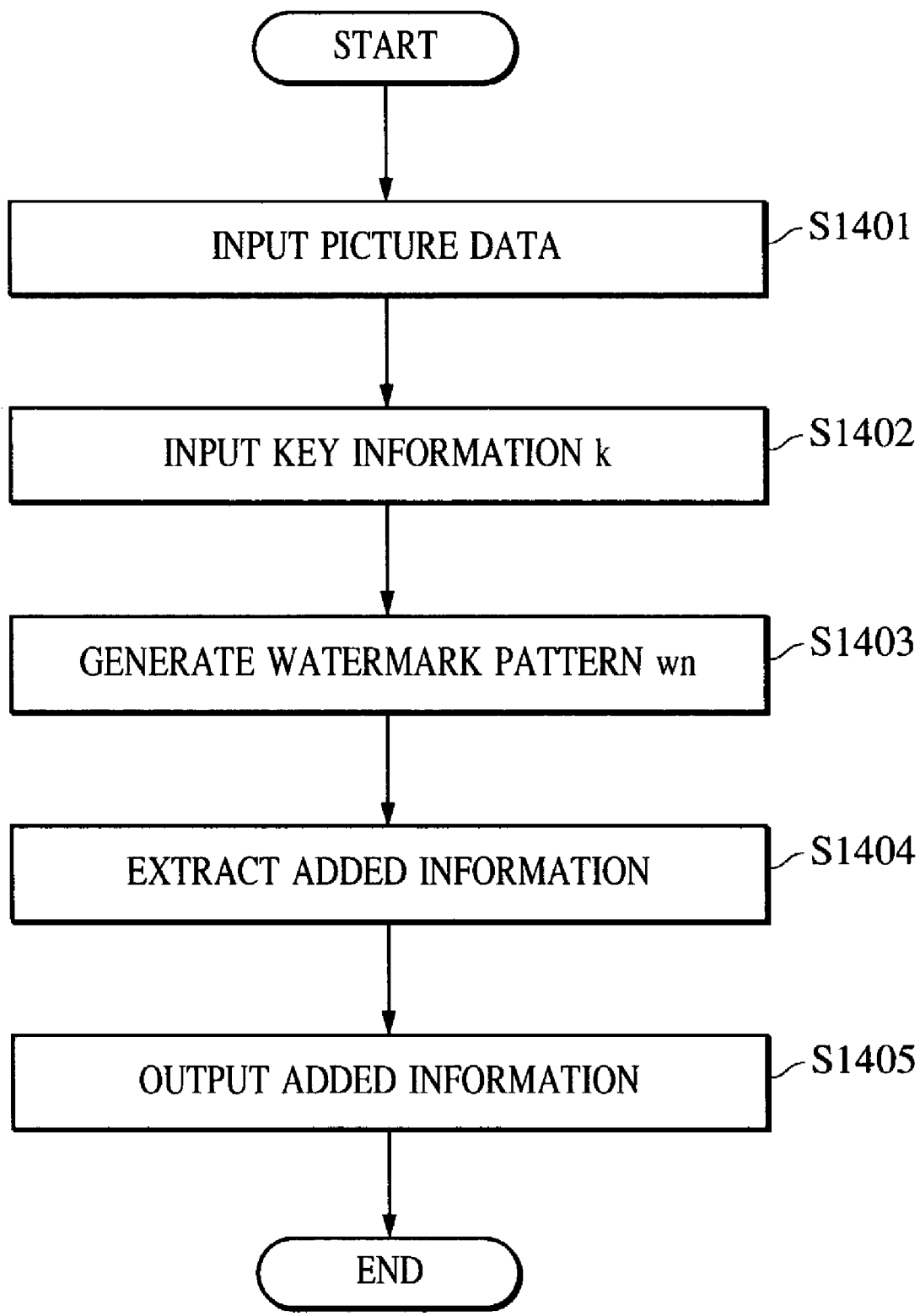
FIG. 14 is a flowchart for describing an operating procedure of an embodiment of the information processing device for extracting added information.

Next is described an operating procedure of the information processing device for extracting the added information embedded in the picture data using the structure described above. FIG. 14 is a flowchart for describing an operating procedure of the information processing device for extracting added information according to this embodiment.

First, the picture data I" embedded with the added information is input from the picture input section 1001 (Step S1401). Next, the key information k to be used when the added information is extracted from the picture data I" is input from the key information input section 1002 (Step S1402). Input order of the picture data I" and the key information k is not limited in this way and it is also possible to input both at once. The key information k is the same as the one used when the input added information was embedded according to the first embodiment.

The input key information k is output to the watermark pattern generating section 1003 where the watermark pattern wn is generated (Step S1403). Thus, the generated watermark pattern wn and the picture data I" are input to the digital watermark extracting section 1004 where the additional information Inf' is extracted using the correlation coefficient (Step S1404). The extracted additional information Inf' is output as a final output from the digital watermark output section 1005 to outside (Step S1405).

Third Embodiment

In the first and second embodiments described above, as examples for efficiently embedding added information, methods to embed 4-bit information by using two pseudo-random number sequences (first and second pseudo-random number sequences r1 and r2) and two two-dimensional regions (first and second regions A, B) are described. However the present invention is not limited to these. According to this embodiment, an example to use a one-dimensional region and two pseudo-random number sequences for embedding one-bit information is described as a more simplified example.

First, embedding of digital watermark information according to this embodiment is described.

A structure of an information processing device for embedding digital watermark information according to this embodiment can be the same as the ones shown in FIG. 1 and FIG. 2. According to this embodiment, operation of the pseudo-random number allocating section 203 of the information processing device is different from that of the first embodiment. Accordingly, in the following, the operation of the pseudo-random number allocating section 203 is described in detail.

Region information m indicating one one-dimensional region, additional information Inf comprising one bit, and two pseudo-random number sequences r1 and r2 are input to the pseudo-random number allocating section 203. The input pseudo-random number sequences r1 and r2 are allocated according to predetermined bit allocating rules, and the watermark pattern w allocated with the pseudo-random number sequences r1 and r2 is output.

As one example of bit allocating rules, when the additional information Inf is bit '0', the pseudo-random number r1 is allocated, while, when the additional information Inf is bit '1', the pseudo-random number r2 is allocated. Additionally, when allocating, pseudo-random number sequences are allocated to all the elements in raster-scanning order. That is, the pseudo-random number sequence is allocated to one one-dimensional region.

Accordingly one watermark pattern w allocated with the pseudo-random number sequence is output from the pseudo-random number sequence allocating section 203. Since a process to be performed on the picture data I at a rear step of the digital watermark embedding section using the output watermark pattern w is the same as in the first embodiment, a description is omitted here.

Next, extracting of digital watermark information according to this embodiment is described.

A structure of an information processing device for extracting digital watermark information according to this embodiment can be the same as the ones shown in FIG. 2 and FIG. 10. According to this embodiment, operations of the watermark pattern generating section 104 and the digital watermark extracting section 1004 of the information processing device are different from those of the second embodiment. Accordingly, in the following, the operations of the watermark pattern generating section 104 and the digital watermark extracting section 1004 are described.

Region information m indicating one one-dimensional region and two pseudo-random number sequences r1 and r2 are input to the watermark pattern generating section 104, and watermark patterns w1, w2 respectively allocated with the pseudo-random number sequences r1 and r2 are output. The pseudo-random number sequences r1 and r2 should be the same as the ones used when embedding digital watermark according to this embodiment. Additionally, a method for allocating should be also the same and for example, as described above, the pseudo-random number sequences are allocated to all the elements in raster-scanning order.

Accordingly two watermark patterns w1, w2 allocated with the pseudo-random number sequences r1 and r2 are output from the pseudo-random number allocating section 203. By using output watermark patterns w1, w2, at the rear step of the digital watermark extracting section 1004, the additional information Inf' embedded in the picture data I" is extracted.

At the digital watermark extracting section 1004, as described in the second embodiment, an integrated picture is generated from the picture data I", cross-correlation values between the generated integrated picture and the watermark patterns w1, w2 are calculated and the additional information Inf' is extracted from the calculated cross-correlation values. For example, when the additional information Inf' is embedded according to the above described bit allocating rules, if the cross-correlation value between the integrated picture and the pseudo-random number sequence r1 is close to +1, the additional information Inf' is determined to be bit '0'. While, the cross-correlation value between the integrated picture and the pseudo-random number sequence r2 is close to +1, the additional information Inf' is determined to be bit '1'. Thus extracted additional information Inf' is output.

Fourth Embodiment

For the above-described first, second and third embodiments, methods for embedding additional information Inf comprising several bits are described while giving some examples. However the present invention is not limited to these and provides a technology applicable to a case where plural kinds of added information are embedded in a state in which the added information required to be embedded is classified into two or more kinds that are recognizable.

In this embodiment, an example to embed two kinds of added information (that is, two ID's) using two regions and two pseudo-random number sequences into one picture is described.

First, embedding digital watermark information according to this embodiment is described.

A structure of an information processing device for embedding digital watermark information according to this embodiment can be the same as the similar ones shown in FIG. 1 and FIG. 2. According to this embodiment, operation of the pseudo-random number allocating section 203 of the information processing device is different from that of the first embodiment. Accordingly, in the following, the operation of the pseudo-random number allocating section 203 is described in detail.

Region information m indicating region information for two regions, two kinds of added information ID1, ID2 and two pseudo-random number sequences r1 and r2 are input to the pseudo-random number allocating section 203. Here, as region information for two regions, the region information shown in FIG. 3 is used in this embodiment. However, this invention is not limited to this and it is also possible to use various kinds of region information. One example of other region information is described later as another embodiment.

In this embodiment, ID1 is embedded in the region A of the one shown in FIG. 3 and ID2 in the region B. Additionally, input added information ID1, ID2 is respectively correlated with input pseudo-random number sequences r1 and r2. That is, the pseudo-random number sequence r1 is allocated to the region A and the pseudo-random number sequence r2 is allocated to the region B respectively, and one watermark pattern w allocated with the pseudo-random number sequence is output from the pseudo-random number allocating section 203. Since a process to use output watermark pattern w and perform on the picture data I at the rear step of the digital watermark embedding section is the same as in the first embodiment, a description is omitted here.

Next, extracting digital watermark information according to this embodiment is described.

A structure of an information processing device for extracting digital watermark information according to this embodiment can be the same as the similar ones shown in FIGS. 2 and 10. According to this embodiment, operations of the watermark pattern generating section 104 and the digital watermark extracting section 1004 of the information processing device are different from those of the second embodiment. Accordingly, in the following, the operations of the watermark pattern generating section 104 and the digital watermark extracting section 1004 are described.

Region information m and two pseudo-random number sequences r1 and r2 are input to the watermark pattern generating section 104, and watermark patterns w1, w2 allocated with the pseudo-random number sequences r1 and r2 respectively are output. Here the pseudo-random number sequences should be, in this embodiment, the same as the pseudo-random number sequences r1 and r2 that were used when the digital watermark was embedded.

Two watermark patterns w1, w2 allocated with pseudo-random number sequences r1 and r2 are thus output from the pseudo-random number allocating section 203. By using output watermark patterns w1, w2, at the rear step of the digital watermark extracting section 1004, the added information embedded in the picture data I" is extracted.

In the digital watermark extracting section 1004, as described in the second embodiment, an integrated picture is generated from the picture data I", cross-correlation values between generated integrated picture and the watermark patterns w1, w2 are calculated, and the added information ID1, ID2 is extracted from calculated cross-correlation values.

For example, when the cross-correlation value between the picture data I" and the watermark pattern w1 is at or above a predetermined value, the picture data I" is determined to be embedded with ID1. Similarly, when the cross-correlation value between the picture data I" and the watermark pattern w2 is at or above a predetermined value, the picture data I" is determined to be embedded with ID2. By this processing, plural kinds of added information can be embedded into one picture.

Fifth Embodiment

In the fourth embodiment described above, an example to embed two kinds of added information into one picture using the region information shown in FIG. 3 is described. In the present embodiment, an example to use other region information other than that shown in FIG. 3 is described. Additionally in this embodiment, a method is described for more securely extracting added information having high importance by setting an importance level for plural kinds (two kinds, in this example) of added information and embedding added information according to the importance level.

Figure 15A:
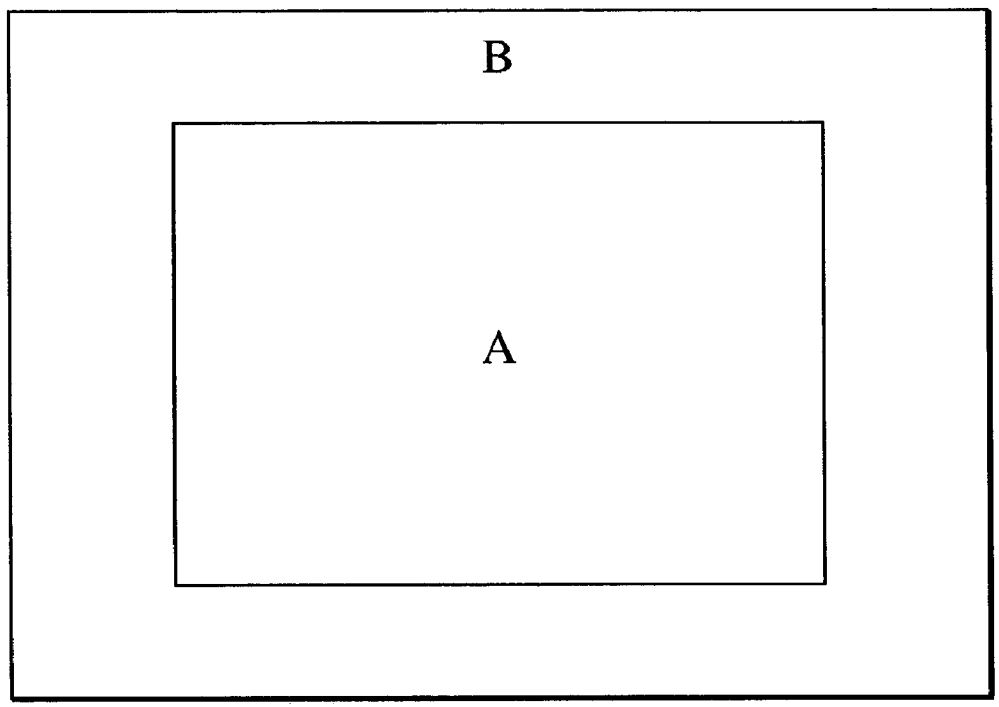
FIGS. 15A and 15B are views illustrating one example of region information m according to a fifth embodiment.
Figure 15B:
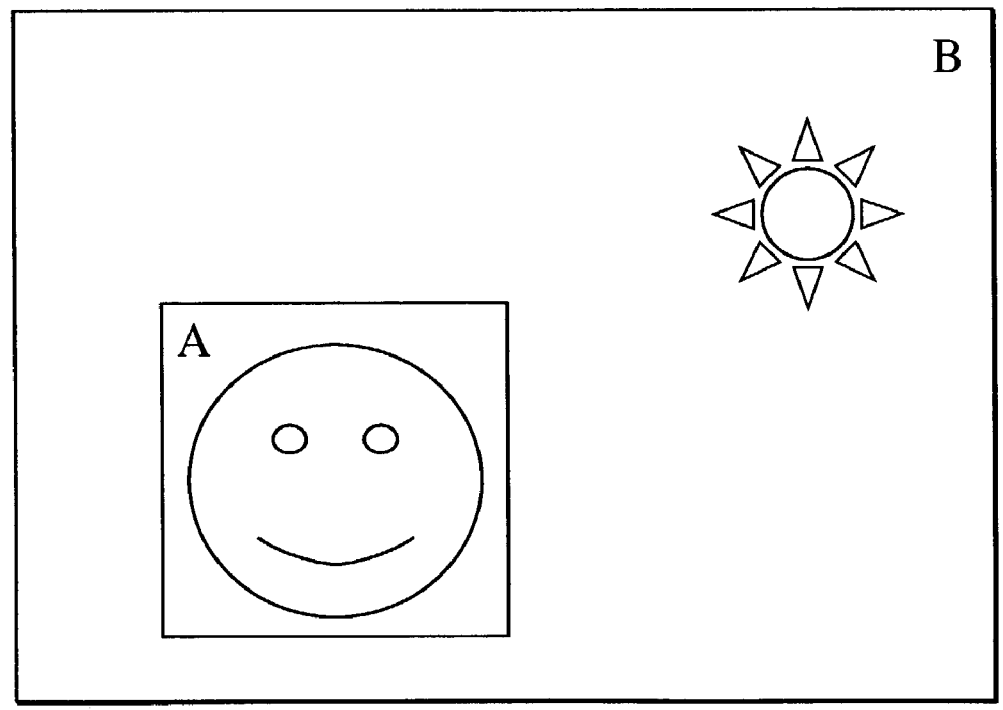

FIGS. 15A and 15B show examples of region information to be used in this embodiment. The whole region shown in FIGS. 15A and 15B has the same area as the picture data. FIGS. 15A and 15B show examples of the region information where the center region of picture data is region A and the outer frame section region is region B. FIGS. 15A and 15B further show examples where an optional region (object, main part in the picture, etc.) specified by a user is region A and the other region is region B. Both examples shown in FIGS. 15A and 15B are the ones supposing that the region A is more important than the region B, and a positional relationship of the regions can be set optionally.

Figure 18A:
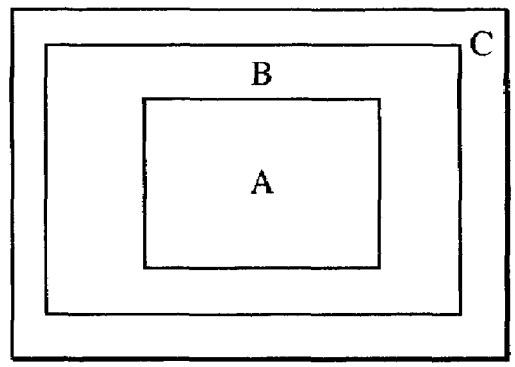
FIG. 18 is a view illustrating a modified example according to the fifth embodiment.
Figure 18B:
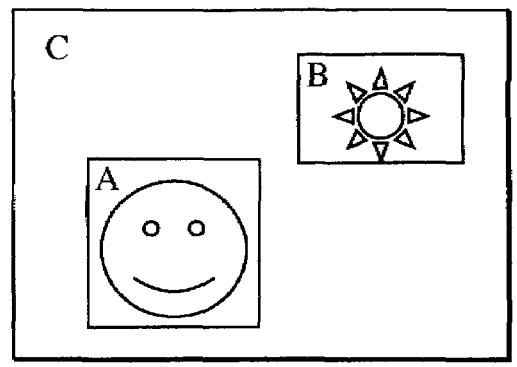

In this embodiment, as shown in FIGS. 15A and 15B, the region information is set such that the picture data is necessarily contained in any of the regions. In this case, any added information is embedded in the whole picture data as a digital watermark. However, the present invention is not limited to this and it is also possible that a region C is set for which a pseudo-random number sequence is not allocated or no added information is embedded (See FIGS. 18A–18B).

Additionally, in this embodiment, an importance level is set for two kinds of added information ID1, ID2, where ID1 is more important than ID2. ID1 (importance is high) is allocated and embedded in the region A shown in FIGS. 15A and 15B and ID2 (importance is low) in the region B. By processing in such a way, even when the picture data embedded with the added information is processed in various ways (for example, cutting out) afterward, ID1 (importance is high) can be more securely extracted than ID2 (importance is low).

Sixth Embodiment

In the fifth embodiment, an example is described to use the region information in a space region (of a real picture) and to set an importance level for two kinds of added information for embedding the added information according to the region information of the space region and the importance level. However, the region information in the present invention is not limited to the region information of the space information, and if it is applied to a case when a digital watermark is embedded in a spatial frequency region, the region information relating to the spatial frequency region is used. This procedure is described in the following.

First, embedding of a digital watermark is described.

A structure of an information processing device for embedding digital watermark information according to this embodiment can be the same as the similar ones shown in FIG. 1 and FIG. 2. According to this embodiment, operations of the watermark embedding section 105 and the pseudo-random number allocating section 203 of the information processing device are different from those of the first embodiment. Accordingly, in the following, the operations of the watermark embedding section 105 and the pseudo-random number allocating section 203 are described in detail.

First, operation of the pseudo-random number allocating section 203 is described. The operation of the pseudo-random number allocating section 203 is the same as in the fourth embodiment. In this embodiment, a spatial frequency region is used as the region information. FIG. 17 shows an example of the region information to be used in this embodiment.

Figure 17A:
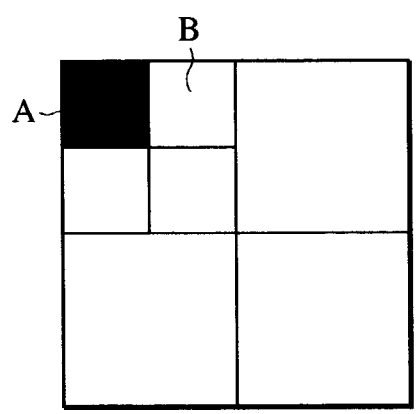
FIG. 17 is a view illustrating region information m according to the sixth embodiment.
Figure 17B:
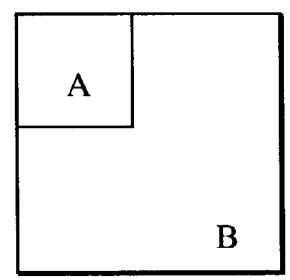
Figure 17C:
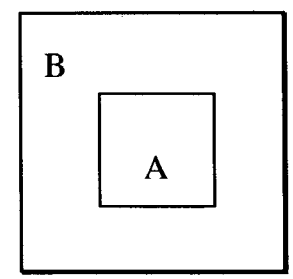

FIGS. 17A, 17B and 17C are examples using respectively discrete wavelet conversion, discrete cosine conversion and discrete Fourier conversion in the spatial frequency converting section described afterward, and an area of the whole region is equal to a process unit of each spatial frequency conversion. The regions set in FIG. 17 are set such that low frequency components are allocated to region A and high frequency components to region B in consideration of the nature of each spatial frequency conversion.

Figure 19A:
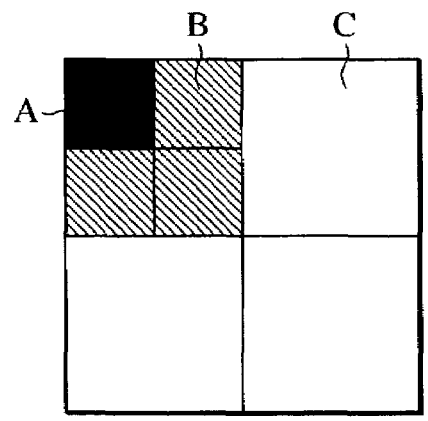
FIG. 19 is a view illustrating a modified example according to the sixth embodiment.
Figure 19B:
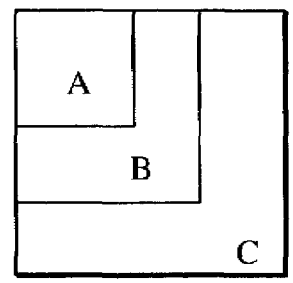
Figure 19C:
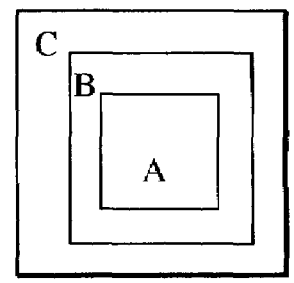

In this embodiment, as shown in FIG. 17, the region information is set such that the picture data is necessarily contained in any of the regions. In this case, any added information is embedded in the whole picture data as a digital watermark. However, the present invention is not limited to this and it is also possible that a region C is set for which a pseudo-random number sequence is not allocated or no added information is embedded (See FIGS. 19A–19C).

As similarly described in the fifth embodiment, an importance level is set for ID1 and ID2. ID1 is set to be more important than ID2, and the pseudo-random number sequences r1 and r2 are respectively allocated to the regions A, B. One watermark pattern w allocated with the pseudo-random number sequence is output from the pseudo-random number sequence allocating section 203.

Figure 16:
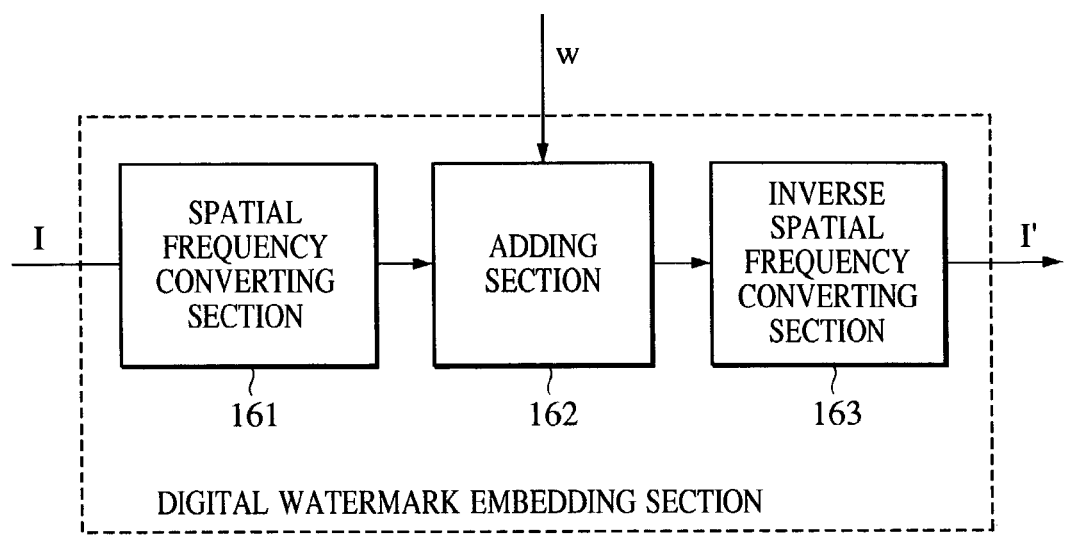
FIG. 16 is a block diagram illustrating the structure of a digital watermark embedding section according to a sixth embodiment.

Next, a detailed structure of the digital watermark embedding section 105 is described. FIG. 16 is a block diagram illustrating the detailed structure of a digital watermark embedding section 105. As shown in FIG. 16, the digital watermark embedding section 105 is formed by a spatial frequency converting section 161, an adding section 162, and an inverse spatial frequency converting section 163.

The picture data I input to the digital watermark embedding section 105 is processed for spatial frequency conversion at the spatial frequency converting section 161 and a spatial frequency coefficient is output. Here, as a spatial frequency converting process, discrete wavelet conversion, discrete cosine conversion or discrete Fourier conversion can be used. Input watermark pattern w is added to the spatial frequency coefficient at the adding section 162.

The coefficient having the watermark pattern w added thereto is input to the inverse spatial frequency converting section 163, and the data processed for inverse frequency conversion is output as I' from the inverse spatial frequency converting section 163.

Next, extracting of digital watermark information according to this embodiment is described.

A structure of an information processing device for extracting digital watermark information according to this embodiment can be the same as the similar ones shown in FIG. 2 and FIG. 10. According to this embodiment, operations of the watermark pattern generating section 104 and the digital watermark extracting section 1004 of the information processing device are different from those of the second embodiment. Accordingly, in the following, the operations of the watermark pattern generating section 104 and the digital watermark extracting section 1004 are described.

First, operation of the watermark pattern generating section 104 is described. Operation of the pseudo-random number allocating section 203 is similar to the fourth embodiment. In this embodiment, as region information, similar region information as that used when embedding a digital watermark as described above should be used.

Figure 20:
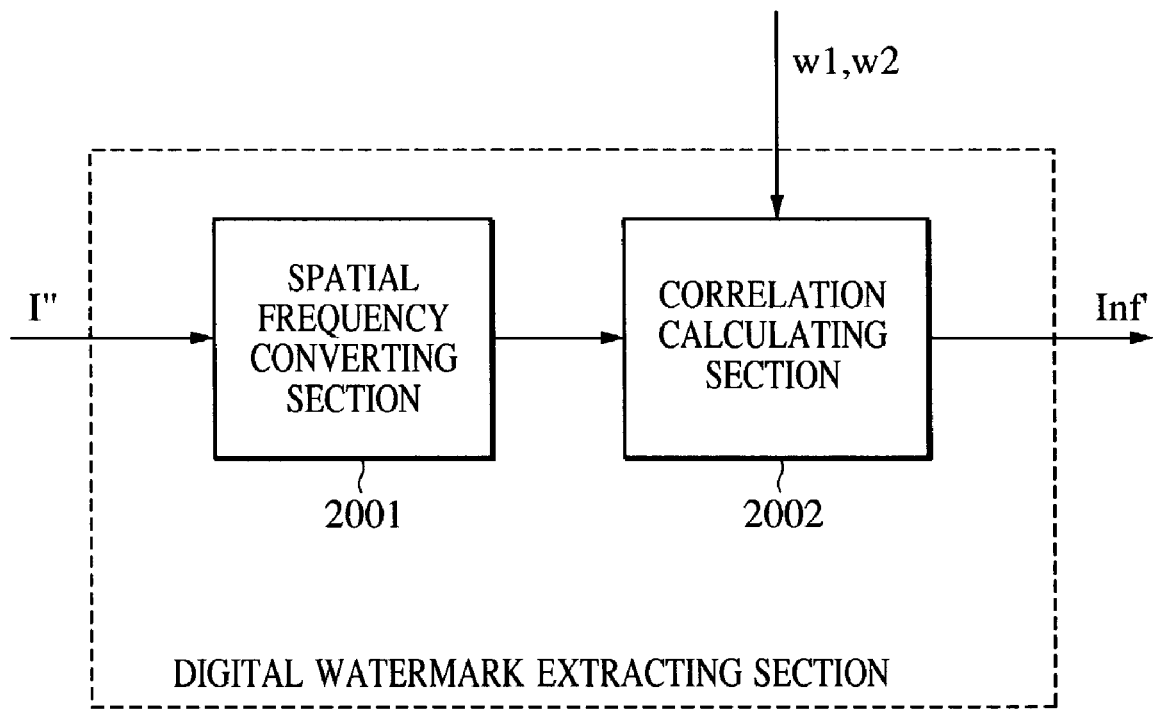
FIG. 20 is a block diagram illustrating the structure of a digital watermark extracting section according to the sixth embodiment.

Next, a detailed structure of the digital watermark extracting section 1004 is described. FIG. 20 is a block diagram illustrating the detailed structure of a digital watermark extracting section 1004. As shown in FIG. 20, the digital watermark extracting section 1004 is formed by a spatial frequency converting section 2001 and a correlation calculating section 2002.

The picture data I" input to the digital watermark extracting section 1004 is processed for spatial frequency conversion at the spatial frequency converting section 2001, and the converted spatial frequency coefficient is output. The spatial frequency converting process used here should be similar to the one executed in the digital watermark embedding process as described above.

Next, for the coefficient generated by the spatial frequency conversion, at the correlation calculating section 2002, cross-correlation values between input watermark patterns w1, w2 and the converted spatial frequency coefficient are calculated. When the cross-correlation value between the watermark pattern w1 and the converted spatial frequency coefficient is larger than a predetermined value, the picture data I″ is determined to be embedded with the added information ID1. When the cross-correlation value between the watermark pattern w2 and the converted spatial frequency coefficient is larger than a predetermined value, the picture data I″ is determined to be embedded with the added information ID2.

By processing in such a way, even when the picture data embedded with the added information is processed in various ways (for example, low-pass filtering, lossy compression) afterward, ID1 (importance is high) can be more securely extracted than ID2 (importance is low).

The technologies described in each embodiment above may be applied to a system comprising plural equipment (for example, host computer, interface equipment, reader, printer, etc.) or a device formed by one piece of equipment (for example, printing machine, facsimile device, etc.).

The objectives of the present invention also can be achieved by supplying a recording medium (or a storage medium) having recorded software program codes to realize functions of the embodiments described above to a system or a device so that a computer (or CPU, MPU) of the system or the device reads out and executes the program codes stored in the recording medium. In this case, the program codes themselves read out from the recording medium realize the functions of the embodiments described above, and the recording medium recorded with the program codes constitutes the present invention.

It is to be understood that, by executing the program codes read out by the computer, not only a case realizing functions of each example described above but also a case to perform some or all of the process by an operating system (OS) operating on the computer according to instructions of the program code and to realize the executing examples described above according to the process are also included in the scope of the present invention.

It is also to be understood that a case where a function extension card and a CPU contained in a function extension unit connected with the computer perform a part or all of the real processes according to instructions of the program codes after the program codes are read out from the recording medium and written in the function extension card and a memory contained in the function extension unit, and the functions of the embodiments described above are realized, is also included in the scope of the present invention.

When the present invention is applied to the recording medium described above, the program codes corresponding to each flowchart described above are stored in the recording medium.

As described above, according to the present invention, plural kinds or multiple bits of added information can be embedded in one picture.

Additionally, when the plural kinds or multiple bits of added information are embedded in one picture in a real picture space or a frequency space, embedding is performed in consideration of afterward handling of each part of the added information according to an importance level of each part, and thereby the added information with high importance can be securely extracted/detected.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing device for embedding n-bit digital watermark information into picture data, comprising:
   setting means for setting $2^n$ coefficient arrangements, which are different from each other,
   selecting means for selecting any one of the coefficient arrangements on the basis of the n-bit digital watermark information to be embedded, and
   embedding means for embedding the n-bit digital watermark information by dividing the picture data into predetermined picture element blocks, correcting the picture element data at the same relative position in each picture element block using a predetermined coefficient of the selected coefficient arrangement and similarly correcting the other picture element data at the same relative positions using other coefficients,
   wherein the embedding means embeds Q n-bit digital watermark information by dividing the group of picture element blocks into Q groups and embedding the n-bit digital watermark information in each group.

2. An information processing device for embedding n-bit digital watermark information into picture data according to claim 1, further comprising:
   key information input means for inputting predetermined key information,
   wherein the setting means sets the coefficient arrangements according to the input key information.

3. An information processing device for embedding n-bit digital watermark information into picture data according to claim 1, further comprising:
   pseudo-random number generating means for generating coefficient arrangements, which are different from each other, using a pseudo-random number sequence.

4. A control method for an information processing device for embedding n-bit digital watermark information into picture data, comprising:
   a setting step of setting $2^n$ coefficient arrangements, which are different from each other,
   a selecting step of selecting any one of the coefficient arrangements on the basis of the n-bit digital watermark information to be embedded, and
   an embedding step of embedding the n-bit digital watermark information by dividing the picture data into predetermined picture element blocks, correcting the picture element data at the same relative position in each picture element block using a predetermined coefficient of the selected coefficient arrangement and sequentially correcting the other picture element data at the same relative position by using the other coefficients,
   wherein, in the embedding step, Q n-bit digital watermark information is embedded by dividing the group of picture element blocks into Q groups and embedding n-bit digital watermark information in each group.

5. A control method for an information processing device for embedding n-bit digital watermark information into picture data according to claim 4,
   wherein, in the setting step, the coefficient arrangements are set according to input predetermined key information.

6. A control method for an information processing device for embedding n-bit digital watermark information into picture data according to claim 4, further comprising:
  a pseudo-random number generating step of generating the coefficient arrangements, which are different from each other, by using a pseudo-random number sequence.

7. A computer program embodied in a computer-readable medium for controlling an information processing device for embedding n-bit digital watermark information into picture data, comprising:
  program code for a setting step of setting $2^n$ coefficient arrangements, which are different from each other,
  program code for a selecting step of selecting any one of the coefficient arrangements on the basis of n-bit digital watermark information to be embedded, and
  program code for an embedding step of embedding the n-bit digital watermark information by dividing the picture data into predetermined picture element blocks, correcting the picture element data at the same relative position in each picture element block by using a predetermined coefficient of the selected coefficient arrangement, and sequentially correcting the other picture element data at the same relative position by using the other coefficients,
  wherein, in the embedding step, Q n-bit digital watermark information is embedded by dividing the group of picture element blocks into Q groups and embedding n-bit digital watermark information in each group.

8. A computer-readable recording medium storing a computer program according to claim 7.

* * * * *

UNITED STATES PATENT AND TRADEMARK OFFICE
CERTIFICATE OF CORRECTION

PATENT NO. : 7,187,781 B2  Page 1 of 1
APPLICATION NO. : 10/320463
DATED : March 6, 2007
INVENTOR(S) : Junichi Hayashi It is certified that error appears in the above-identified patent and that said Letters Patent is hereby corrected as shown below:

Col. 7, line 14, "mark is" should read --marks are--.

Col. 12, line 65, "extracting different" should read --extracting digital watermark information from picture data having n-bit digital watermark information embedded therein so as to prevent a person from perceiving its existence, comprising a setting means for setting $2^n$ coefficient arrangements, which are different--.

Col. 15, line 15, "above described" should read --above-described--.

Col. 20, line 23, "n-bit" should read --Q x n-bit--.

line 57, "n-bit" should read --Q x n-bit--.

Col. 22, line 8, "n-bit" should read --Q x n-bit--.

Signed and Sealed this

Twenty-ninth Day of December, 2009

David J. Kappos
*Director of the United States Patent and Trademark Office*